No. 648,124. Patented Apr. 24, 1900.
F. A. HEADSON.
ROTARY ENGINE.
(Application filed Feb. 26, 1900.)
(No Model.) 4 Sheets—Sheet 3.
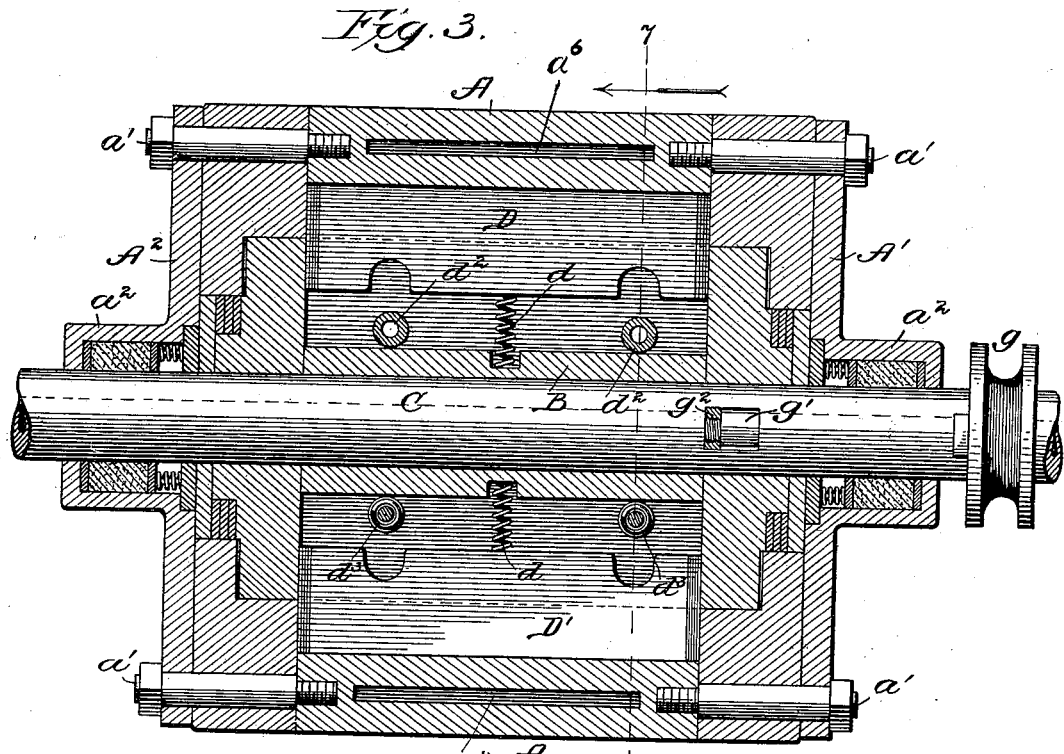
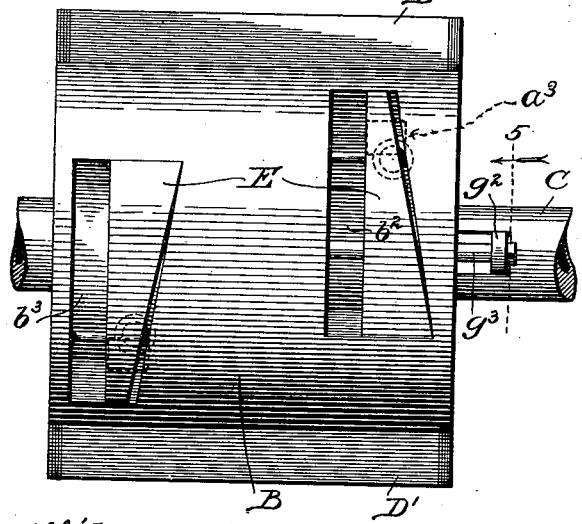
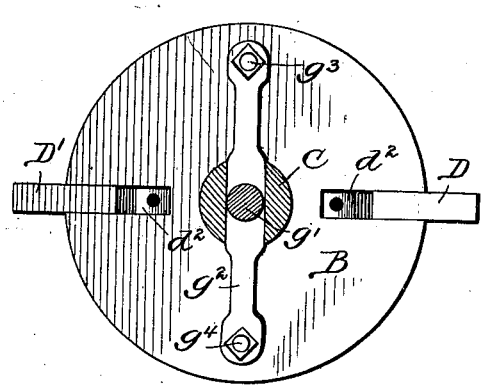
Witnesses:
Chas. E. Gaylord.
John Enders Jr.
Inventor:
Frank A. Headson,
By Banning & Banning & Sheridan
Att'y
THE NORRIS PETERS CO., PHOTO-LITHO., WASHINGTON, D. C.

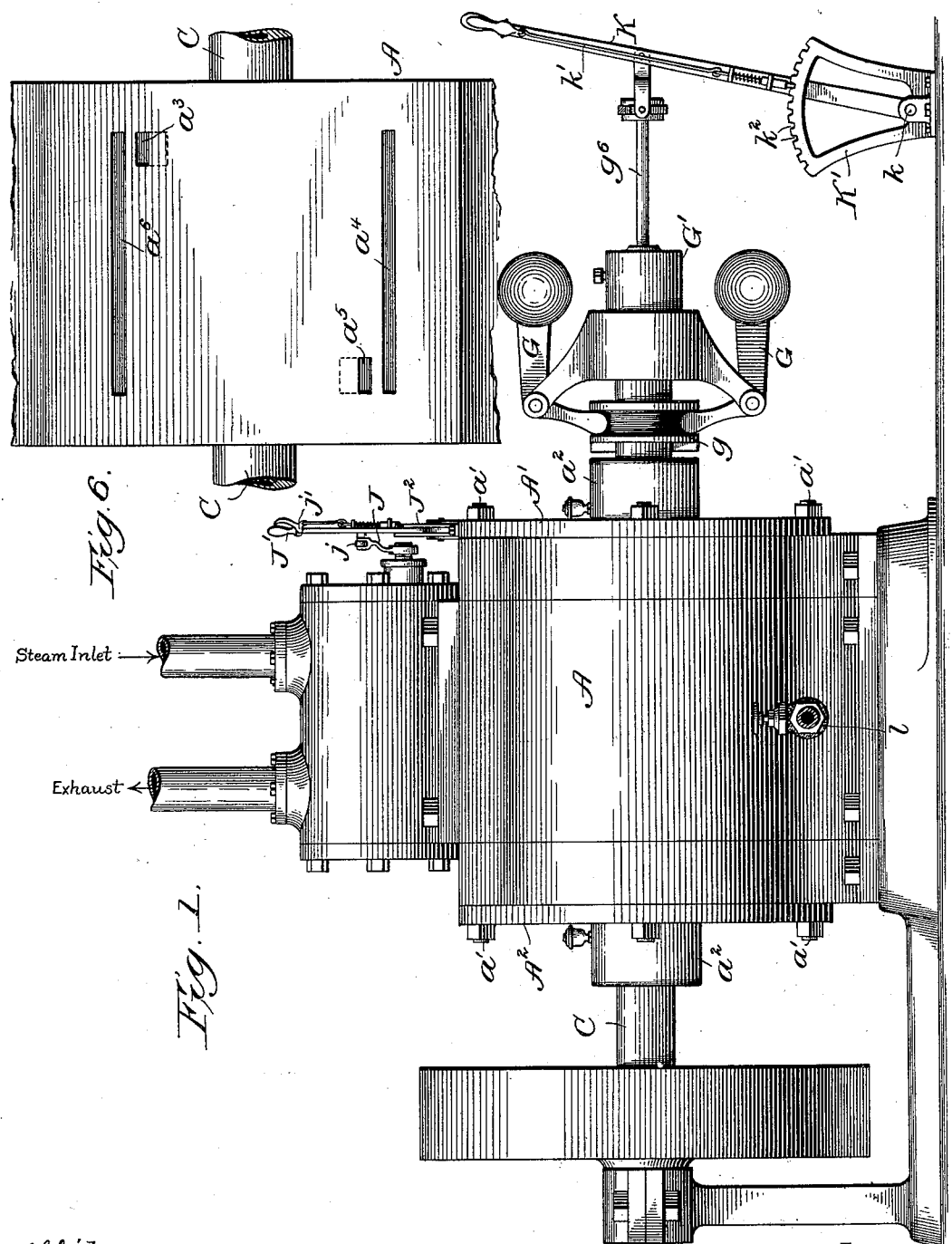

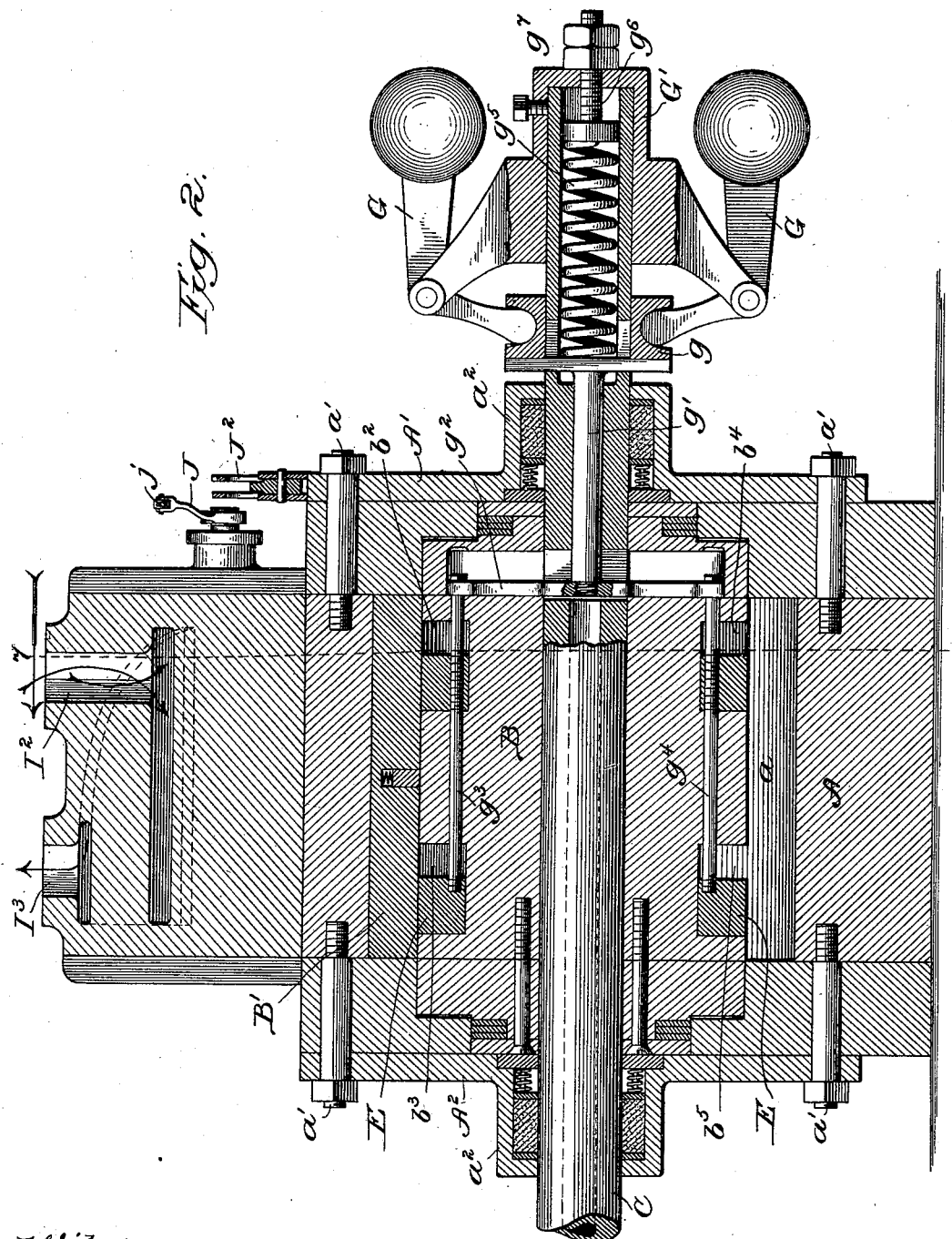

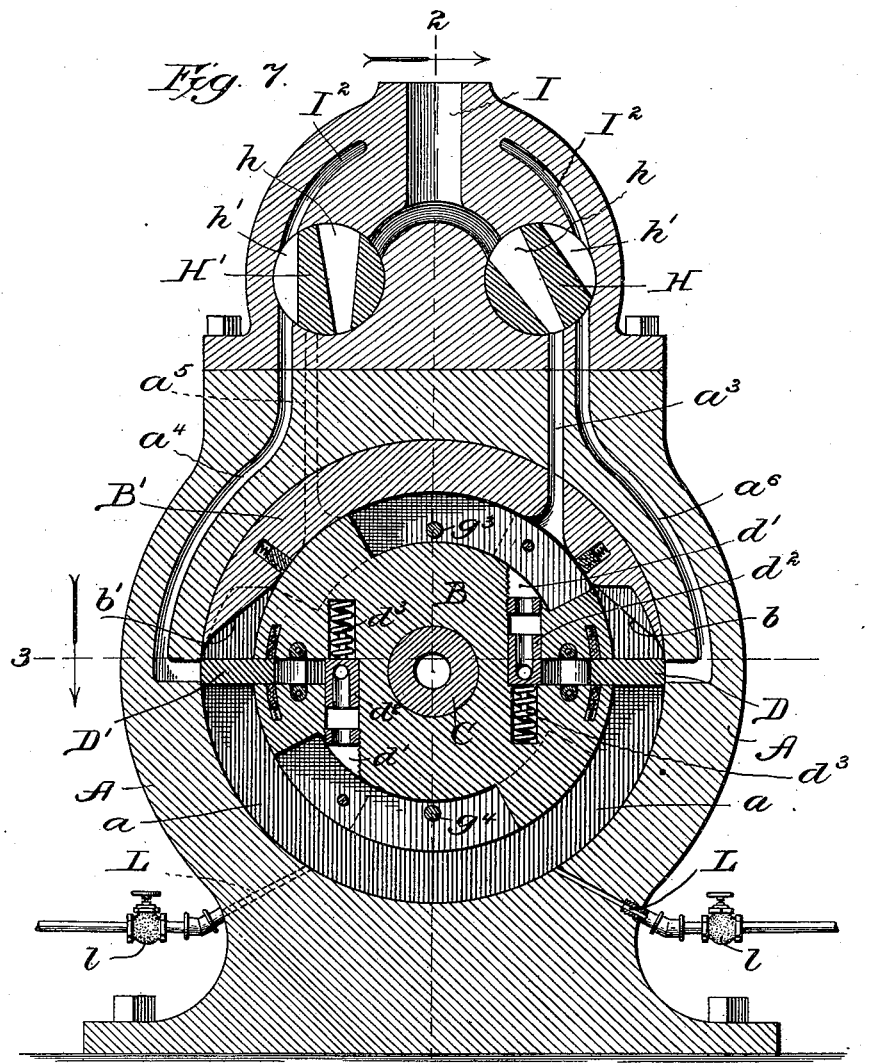
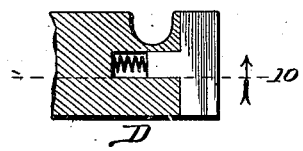
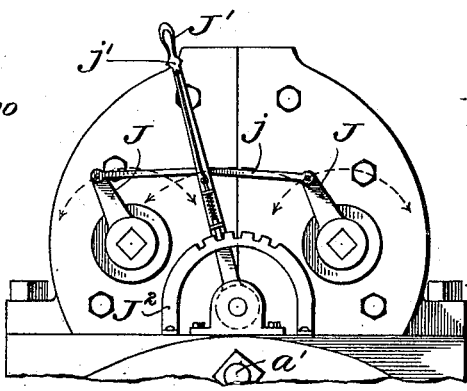

UNITED STATES PATENT OFFICE.

FRANK A. HEADSON, OF LAFAYETTE, INDIANA.

ROTARY ENGINE.

SPECIFICATION forming part of Letters Patent No. 648,124, dated April 24, 1900.

Application filed February 26, 1900. Serial No. 6,514. (No model.)

*To all whom it may concern:*

Be it known that I, FRANK A. HEADSON, a citizen of the United States, residing at Lafayette, in the county of Tippecanoe and State of Indiana, have invented certain new and useful Improvements in Rotary Engines, of which the following is a specification.

This invention relates to that class of engines styled "rotary" engines, which are arranged to have their operating or main shafts rotated directly by the motive fluid without the use of reciprocating parts, cranks, connecting-rods, and similar elements, all of which will more fully hereinafter appear.

The principal object of the invention is to provide a simple, economical, and efficient rotating engine.

A further object of the invention is to provide a rotary engine with cut-off or similar valve mechanism which will permit the motive fluid to be used expansively as well as at high pressure.

Other objects of the invention will appear from an inspection of the drawings and the following description and claims.

The invention consists principally in the combination of a cylinder provided with inlet and outlet passages and a piston rotatably mounted therein to cover and uncover the inlet passages and permit the introduction of motive fluid and shut it off at desired times.

The invention consists, further, in the combination of a cylinder provided with inlet and exhaust passages and a piston rotatably mounted therein and adapted to cover and uncover the inlet-passages and provided with wing mechanism to rotate the piston-head.

The invention consists, further and finally, in the features, combinations, and details of construction hereinafter described and claimed.

In the accompanying drawings, Figure 1 is a side elevation of a complete engine constructed in accordance with my improvements. Fig. 2 is a longitudinal sectional elevation taken on line 2 of Fig. 7 looking in the direction of the arrow. Fig. 3 is a plan sectional view of the parts taken on line 3 of Fig. 7 looking in the direction of the arrow. Fig. 4 is a plan view of the piston-head and attached parts looking at it from the top, as shown in Figs. 2 and 7, and illustrating the "cut-off valves" in such position as to practically cut off all motive fluid. Fig. 5 is an end view of the piston-head, shown partly in section, taken at about line 5 of Fig. 4, looking in the direction of the arrow. Fig. 6 is a plan view of the upper portion of the cylinder with the valve-casing removed and looking at it from the top. Fig. 7 is a cross-sectional elevation taken on lines 7 of Figs. 2 and 4 looking in the direction of the arrows. Fig. 8 is an end view of the valve-casing, showing the mechanism for operating the "reversing-valves." Fig. 9 is a horizontal sectional view of a portion of one of the wings, taken on line 9 of Fig. 10; and Fig. 10 is a sectional view of a portion of one of the wings, taken on line 10 of Fig. 9.

In the art to which this invention relates it is well known that the principal objection to the use of rotary engines is that they are great steam eaters and that the steam has generally to be admitted at full pressure and used during the entire rotation of the piston at such pressure, the resultant effect of which is felt at the coal-pile. It becomes desirable, therefore, to provide means by which the steam or other motive fluid can be cut off at any desired point of rotation of the piston, so as to use it expansively, and thus obtain the full effect of the steam. It is also desirable to provide a sensitive governor and one that can be used to regulate the point of cut-off when the piston is rotating in either direction, so as to obtain as close regulation to a certain speed as possible, and, further, to provide means by which the objection of the "dead-center" can be minimized or removed. My invention therefore is designed principally to remove these objections and to provide a simple, economical, and efficient rotary engine with means to obtain the advantages above noted.

In constructing an engine in accordance with these improvements a main frame portion A, of the desired size, shape, and strength to support and contain the operative and other mechanisms in position for use, is provided. The shape of this engine is preferably rectangular when viewed in side elevation (see Fig. 1) and of a substantially-cylindrical contour when viewed in end or front elevation, as will be seen from an examination of Fig. 7.

The frame portion is bored out to a suitable diameter and extends from end to end, so as to present when all the other parts are left out of consideration a perfect cylindrical chamber, which I will term the "operating-chamber" $a$. This chamber is closed at both ends by means of two cylindrical heads $A'$ and $A^2$, secured to the main frame by means of bolts $a'$, and furnishes the bearing portion $a^2$, in which the journals of the main rotatable shaft are rotatably mounted. This cylinder portion is also provided with two sets of inlet and exhaust passages arranged substantially opposite each other, the exhaust-openings being diametrically opposite the inlet-passage $a^3$ of one side and coöperating with the exhaust-passage $a^4$ on the other side and the inlet-passage $a^5$ of the other side coöperating with the exhaust-passage $a^6$, all of which are necessary to provide for the rotation of the piston-head in either direction.

To provide for the conversion of the motive fluid into work done—viz., the rotation of a main shaft—a piston-head B is provided and securely mounted upon so as to rotate a main shaft C, which has its journal portions rotatably mounted in the boxes or bearings $a^2$ of the cylinder-heads in such manner that the longitudinal axis of the piston coincides with the axis of the operating-chamber. Arranged in the operating-chamber and preferably at the upper portion thereof is a crescent-shaped bushing $B'$, formed by taking the portion of a cylinder and chamfering both of its lower edges, so that they form cam portions $b$ and $b'$ to move the wings inwardly, as hereinafter described. This bushing is also provided with passages, which form a continuation of the inlet-passages $a^3$ and $a^5$. An inspection of Fig. 7 of the drawings will show that the peripheral surface of the piston-head contacts the inner surface of the crescent-shaped bushing, so as to cover and uncover the inlet-passages and permit the introduction of motive fluid and prevent it from entering into the operating-chamber at desired times, as is more fully hereinafter set forth.

To provide means by which the motive fluid may be supplied to the operating-chamber, the peripheral surface of the piston-head is preferably provided with four steam pockets or chambers $b^2$, $b^3$, $b^4$, and $b^5$. An examination of Figs. 2 and 7 will show that the steam-pockets $b^2$ and $b^4$ are diametrically opposite to each other and on the front end of the piston-head, while the steam-pockets $b^3$ and $b^5$ are diametrically opposite each other and at or near the rear end of the peripheral surface of the piston-head and on opposite sides of a longitudinal line from the other pockets. In Fig. 4 a plan view of the pockets is shown, and it will be seen that they resemble a portion of a wedge when viewed in a flat plane, the widest end of which is at or near the upper portion of the piston-head and the narrow end at or near the lower or side portion, the reasons for which will hereinafter be more fully set forth. The steam-pockets $b^2$ and $b^4$ are arranged so that as the piston rotates toward the right, in the direction of the hands of a watch, the steam enters such pockets from the inlet-passage $a^3$ at the narrow or lower end and is cut off at or near the wide end, and when the piston is being rotated to the left the steam from the inlet-passages $a^5$ enters the steam-pockets $b^3$ and $b^5$ at their narrow end and is cut off at the wide end. It will also be seen that but for these pockets practically no steam or other motive fluid whatever could enter the operating-chamber.

To take the full advantage of the motive fluid and convert the energy into work done, as above suggested, the piston-head is provided with a pair of wing portions D and D' let into radial wing-grooves in the piston-head parallel to or in line with the axis of the piston. These wing portions are loosely mounted in the piston-head and kept normally at their outer limit of motion by means of helical springs $d$, arranged between the core of the piston-head and the inner edges of the wings, as shown particularly in Fig. 3. As the piston-head is rotated (see Fig. 7) toward the right the motive fluid passing down through the inlet-passage $a^3$ enters the proper steam-pockets $b^2$ and $b^4$, from which it passes out into the operating-chamber above the wing D. Impacting against the wing for a time it moves such wing downwardly and carries it, with the piston, around until the wing comes opposite or above the exhaust-passage $a^4$, from which it escapes, as will be more fully hereinafter set forth. Continuing its movement the outer end of the wing contacts the lower cam portion $b'$ of the crescent-shaped bushing and is moved inwardly against the tension of its spring mechanism. Before this exhaust takes place the rear wall of the steam-pocket $b^2$ has passed the inlet-passage or opening $a^3$ and steam has been cut off, say, at one-quarter of the rotation of the piston-head, so that during the remaining quarter of the rotation or the remaining half of the "stroke," as it might be properly termed, the motive fluid has been used expansively. It will be seen, however, that the size or capacity of the pocket regulates the time during which the piston is operated by full or high pressure and the time during which the motive fluid operates expansively. It is desirable, however, that means should be provided to control the introduction of the motive fluid for its cut-off at any desired point in the rotation of the piston-head. To accomplish this result, each of the steam-pockets is provided with a substantially wedge-shaped cut-off valve E of similar shape as the contour of but somewhat smaller or narrower than the pocket. The cut-off valves are movably arranged in the pockets, so that they can readily be moved from one side wall of each pocket to the other. (See Fig. 4.)

Supposing the valves to be arranged in the position shown in Figs. 2 and 7—that is, over against the rear or straight walls of the pocket—the motive fluid will be let into the pockets, and thereby into the operating-chamber, at the maximum amount and for the greatest length of time. When they are moved over into the position shown in Fig. 4, however, against or adjacent to the inclined front walls of the steam-pockets, practically all motive fluid is cut off from entering the steam-pockets, and thereby the operating-chamber. The movement of these cut-off valves can be obtained by any desired means and be capable of being operated by hand or otherwise, as desired. It is desirable, however, that some means be provided for operating these cut-off valves by and during the rotations of the piston-head, so that a predetermined speed can be obtained and kept as long as it is necessary or desirable to keep such speed. In order to obtain this result, a centrifugal governor is provided and mounted upon the main shaft at or near one end thereof. This governor is preferably formed of two weighted or ball levers G, pivoted on suitable arms to a hub portion $G'$, which in turn is secured in any desired manner to the rotatable shaft, so that as the shaft is rotated the balls are thrown by centrifugal force, and as the balls are thrown outwardly the inner ends of their levers are operated substantially in line with the axis of the rotatable shaft. The inner ends of the governor or ball levers are inserted in a groove of a sleeve or movable collar $g$, which is connected with the cut-off valves by means of a rod $g'$, strap $g^2$, and the valve-rods $g^3$ and $g^4$, the valve-rod $g^3$ connecting the cut-off valves $b^2$ and $b^3$ with the strap $g^2$, while the valve-rod $g^4$ connects the cut-off valves $b^4$ and $b^5$ with the same strap. It will thus be seen that as the speed of the rotatable shaft increases or reaches its maximum the sleeve is moved by the governor-levers toward the right from the position in which it is shown in Fig. 2, thereby moving the cut-off valves in the same direction, so that the motive fluid may be practically cut off at the desired point. When the speed of rotation decreases or ceases entirely, a helical governor-spring $g^5$ forces the sleeve toward the left into the position shown in Fig. 2 and permits the maximum pressure to again enter the operating-chamber. The tension on the governor-spring $g^5$ is regulated by means of a plunger $g^6$, which in turn is regulated by means of the stay and jam nuts $g^7$ upon its threaded stem.

From the foregoing it will be seen that the tension of the governor-spring practically regulates the speed at which the piston, with the main shaft, is rotated, depending naturally upon the pressure at which the motive fluid is furnished, and such speed can be maintained just as long as the desired pressure is furnished and the tension of the governor-spring maintained. It will also be noticed that the mechanism of this governor and its arrangement are such that the speed can be maintained without change of the governor or any of its parts in either direction in which the piston-head may be rotated.

It is desirable to equalize the pressure at the inner edges of the wing mechanism, so that there will be no tendency to force them inwardly by the high pressure in their outer edges, and thus prevent leakage. In order to accomplish this result, a channel $d'$ is provided for each steam-pocket and leads therefrom to the bottom of each of the winged grooves. In each of these channels is arranged a movable tube or thimble $d^2$, having an axial and radial opening, the axial opening of which connects with the steam-pockets and the radial opening thereof with the bottom of the winged grooves when the parts are in the position shown in Fig. 7. The motive fluid when admitted to the steam-pockets forces these tubes into such position and against the tension of the springs $d^3$. When the motive fluid ceases, the tension-springs $d^3$ force the thimbles outwardly and cut off communication with the winged grooves.

To provide for the introduction of the motive fluid so as to rotate the piston-head in either direction, the two sets of inlet and exhaust passages above referred to are provided. Arranged intermediate these two sets of passages, so as to close or open the same, is a pair of reversing-valves H and H'. These valves are preferably made in the shape of grooved cylindrical rods, each having two passages—$h$ the inlet and $h'$ the exhaust passage thereof. When the parts are in the position shown in Fig. 7, the motive fluid entering through the main supply-passage I passes into the inlet-passage $h$ of the reversing-valve H, thence down through the inlet-passage $a^3$, hereinbefore referred to, so as to operate the parts, as already described. This accomplishes the desired general rotation of the main shaft—namely, toward the right. When it is desired to rotate it toward the left, as is required particularly in marine engines, both of the reversing-valves are moved simultaneously toward the right, so that the valve H closes its inlet-passage, while the inlet-passage $h$ of the reversing-valve H' connects the branch of the main supply-passage with the inlet-passage $a^5$. This action permits steam to enter into the steam-pocket $b^3$ of the piston-head, from which it would just enter into the operating-chamber $a$, impact the wing D', and rotate the piston-head toward the left against the rotation of the hands of a watch. Continuing its rotation for one-quarter of a turn high pressure is admitted and then cut off, so that it acts expansively for the remaining quarter-rotation and until the wing passes the exhaust-passage $a^6$. The motive fluid then passes through such passage, through the exhaust-passage $h'$ of the reversing-valve H, and out through the continuation or branch exhaust-passage I² into the exhaust-opening I³. (Shown particularly in Fig. 2.) To operate these reversing-valves simultaneously, (see Fig. 8,) the outer end of each valve is provided with an arm or bell-crank J, which are connected together and to an operating-lever J' by means of rods j. This operating-lever has a catch or trip j', adapted to enter notches in a curved holding-frame J². By this means the reversing-valves can then be moved to any desired point and held at such point whenever it becomes desirable or necessary.

There may be times when the parts would approach what might be termed a "dead-center"—that is, a time when the motive fluid could not enter the operating-chamber, so as to rotate the piston. In order to overcome this objection, the inlet-passages $h$ of the reversing-valves are made wider at the top than at the bottom, so that as they are moved in one direction or the other—say, as the reversing-valve H is moved farther toward the left, it will still continue to connect with the branch of the supply-passage until it registers with the exhaust-passage $a^6$. The motive fluid will then enter such exhaust-passage into the operating-chamber and move the rotatable piston out of its dead-center position. The reversing-valves may then be moved to the desired position to admit the motive fluid in the desired manner and rotate the parts in the desired direction.

I have illustrated in the different figures of the drawings—viz., in Figs. 2, 3, 7, 9, and 10—packings for the different parts, which prevent leakage of the motive fluid, such as the metallic packing for the journals of the main shaft, the packings for the ends of the piston-head, and the packing for different portions of the wing mechanism; but as all kinds of packing are old in the art I do not deem it necessary to describe the same in detail, for the reason that the construction and arrangement of such packings are very clearly shown in the figures above referred to.

It is well known that in marine engines it is desirable to change the speed of the engine quickly. In order to do this, the tension of the governor-spring must also be changed quickly. To accomplish this result, I extend the plunger-stem $G^6$ (see Fig. 1) outwardly quite a distance and connect its end with an operating-lever K, which operating-lever may be pivoted in any desired manner at $k$. This operating-lever is also provided with a trip and catch $k'$, of the desired form of construction, adapted to engage with the notches $k^2$ of a frame K'. By this mechanism the tension of the governor-spring may be varied quickly to any desired point, either to obtain a high or low speed, and thus provide for different circumstances and conditions. I have also provided the operating-chamber with pipes and passages L, having globe-valves $l$, through which the water of condensation may be removed from such chamber whenever it is desirable or necessary.

While I have illustrated and described my improvements in connection with an engine capable of being rotated in either direction, it will of course be understood by those skilled in the art that but one set of inlet and exhaust passages are required to provide an engine that has to rotate in but one direction. Consequently one or both of the reversing-valves can be dispensed with and an ordinary throttle-valve applied to the main supply-passage, the governor and cut-off valves acting to control the "cut-off" of the motive fluid at the desired times.

I claim—

1. In an engine of the class described, the combination of a cylinder provided with inlet and outlet passages, a piston rotatably mounted therein provided with a pocket or pockets adapted to cover and uncover the inlet passage or passages, and valve mechanism movably mounted in the pockets to regulate or cut off the motive fluid at desired times, substantially as described.

2. In an engine of the class described, the combination of a cylinder provided with inlet and outlet passages, a piston rotatably mounted therein provided with a pocket or pockets arranged in the peripheral surface thereof to cover and uncover the inlet-passages during the rotations of the piston, a cut-off valve movably arranged in each pocket, and a governor secured to the rotatable piston to operate the cut-off valve and thereby regulate or cut off the motive fluid at desired times, substantially as described.

3. In a rotary engine, the combination, with a cylinder provided with inlet and exhaust passages, of a piston rotatably mounted therein, the periphery of which is provided with peripheral pockets or chambers in position to register with the inlet-passages as the piston is rotated, and means for varying the size of said chambers, substantially as described.

4. In a rotary engine, the combination, with a cylinder provided with inlet and exhaust passages, of a piston rotatably mounted therein provided with chambers in position to register with the inlet-passages as the piston is rotated, a cut-off valve in each chamber, and a governor for moving said cut-off valves as the piston is rotated in either direction, substantially as described.

5. In a rotary engine, the combination, with a cylinder provided with inlet and exhaust passages, of a piston rotatably mounted therein, the periphery of which is provided with wedge-shaped chambers the forward end of which normally registers with the inlet-passage, and means for varying the capacity of said chambers and causing the steam to be cut off at the desired point of rotation of the piston, substantially as described.

6. In a rotary engine, the combination, with a cylinder provided with inlet and exhaust passages, of a piston rotatably mounted therein, the periphery of which is provided with wedge-shaped chambers in position to register with the inlet-passages as the piston is rotated, a laterally-movable cut-off valve in each chamber and means for moving said valve laterally to cause the steam to be cut off at a desired point or points in the rotation of the piston, substantially as described.

7. In a rotary engine, the combination, with a cylinder provided with inlet and exhaust passages, of a piston rotatably mounted therein, the diametrically-opposite sides of which are provided with outwardly and inwardly movable wings or blades, and two oppositely-extending pockets or chambers between the blades in position to register with the inlet-passages as the piston is rotated, and means for simultaneously varying the capacity of the different chambers, substantially as described.

8. In a rotary engine, the combination, with a cylinder provided with inlet and exhaust passages of a piston rotatably mounted therein, the diametrically-opposite sides of which are provided with inwardly and outwardly movable wings or blades and with two oppositely-extending pockets or chambers between the blades, in position to register with the inlet-passages as the piston is rotated, a cut-off valve in each chamber, a rod secured to the cut-off valves upon each side of the piston, and a governor for moving the rods and cut-off valves simultaneously, substantially as described.

9. In a rotary engine, the combination, with a cylinder provided with inlet and exhaust passages, of a piston rotatably mounted therein, the diametrically-opposite sides of which are provided with inwardly and outwardly moving wings or blades and with two oppositely-extending chambers in position to register with the inlet-passages as the piston is rotated, a cut-off valve in each steam-chamber, a strap each end of which is provided with a rod in engagement with the cut-off valves upon one side of the piston, a stem secured to the strap, and a governor at the outer end of said stem, substantially as described.

10. In a rotary engine, the combination, with a cylinder provided with inlet and outlet passages, of a piston rotatably mounted therein, the periphery of which is provided with inwardly and outwardly moving wings or blades and oppositely-extending pockets or chambers, a cut-off valve in each pocket or chamber, a strap each end of which is provided with a rod in engagement with two of the cut-off valves, and a stem extending longitudinally within the piston-shaft, and a governor in engagement with the outer end of the stem to move it in one direction, and spring mechanism to move the valves in the direction opposite to that of the governor, substantially as described.

11. In a rotary engine, the combination, with a cylinder provided with inlet and exhaust passages, of a piston rotatably mounted therein the periphery of which is provided with inwardly and outwardly movable wings or blades and with oppositely-extending peripheral pockets or chambers, a cut-off valve in each chamber, a strap extending through the main shaft, each end of which is provided with a rod in engagement with two of said cut-off valves, a stem seated in a longitudinal recess of the main shaft, a sleeve secured to the outer end of the stem, a governor in engagement with said sleeve, a governor-spring in engagement with said sleeve, and means for varying the tension of the said governor-spring, substantially as described.

12. In a rotary engine, the combination, with a cylinder provided with inlet and exhaust passages, of a piston rotatably mounted therein, provided with two radially-extending grooves, two sets of steam-pockets between the grooves, and with a channel leading from each stem-pocket to one of the wing-grooves, a spring-actuated thimble or tube in each channel adapted to be moved inwardly by fluid-pressure against the action of the spring the inner end of said tube being perforated to register with a wing-groove when the tube is pressed inwardly against the spring, and an inwardly and outwardly movable blade in each wing-groove arranged to be pressed outwardly by fluid-pressure, substantially as described.

13. In an engine of the class described, the combination of a cylinder provided with two sets of inlet and outlet passages, a piston rotatably mounted in the cylinder adapted to cover and uncover the inlet-passages during its rotations to permit the introduction of and shut off the motive fluid at desired times, wing mechanism in the piston, and valve mechanism movably mounted in the inlet and outlet passages to change the motive fluid from one inlet-passage to another and cut off the exhaust from one passage and permit it to exhaust through the other to provide for the rotation of the piston in either direction, substantially as described.

14. In an engine of the class described, the combination of a cylinder provided with two inlet-passages and two outlet-passages arranged substantially diametrically opposite each other the inlet-passage on one side of the cylinder arranged to coöperate with the outlet-passage on the other side of the cylinder, two reversing-valves arranged in such passages one reversing-valve acting to cut off the inlet and open the outlet on one side of the cylinder and the other at the same time to open the inlet and cut off the exhaust on the opposite side of the cylinder, means for operating these reversing-valves simultaneously, and a piston rotatably mounted in the cylinder adapted to cover and uncover the inlet-passages by and during its rotations and provided with wing mechanism whereby the movements of the reversing-valves tend to rotate the piston in either direction, substantially as described.

15. In an engine of the class described, the combination of a cylinder provided with inlet and outlet passages, a piston rotatably mounted in such cylinder and provided with a steam-pocket to cover and uncover the inlet passage or passages by and during its rotations and with wing mechanism adapted to control the exhaust, and a valve arranged in the inlet and outlet passages between the main supply channel and the exhaust-opening and arranged to connect the main supply channel with either the inlet or exhaust so as to destroy a dead-center, substantially as described.

FRANK A. HEADSON.

Witnesses:
THOMAS F. SHERIDAN,
THOMAS B. MCGREGOR.